United States Patent [19]

Radenkovic

[11] 4,121,566
[45] Oct. 24, 1978

[54] SONIA SYSTEM

[76] Inventor: Ljubomir Radenkovic, P.O. Box 3068, Kano, Nigeria

[21] Appl. No.: 565,863

[22] Filed: Apr. 7, 1975

[51] Int. Cl.² .............................................. F24J 3/02
[52] U.S. Cl. .................................. 126/271; 237/1 A; 126/400; 350/288; 350/293
[58] Field of Search ....................... 126/270, 271, 400; 237/1 A; 350/288, 293

[56] References Cited

U.S. PATENT DOCUMENTS

| | | | |
|---|---|---|---|
| 1,855,815 | 4/1932 | Abbot | 126/271 |
| 3,321,012 | 5/1967 | Hervey | 126/271 |
| 3,884,217 | 5/1975 | Wartes | 126/271 |
| 3,915,147 | 10/1975 | Rineer | 126/271 |
| 3,915,148 | 10/1975 | Fletcher et al. | 126/271 |
| 3,923,039 | 12/1975 | Falbel | 126/271 |
| 3,974,824 | 8/1976 | Smith | 126/271 |
| 3,994,279 | 11/1976 | Barak | 126/271 |

FOREIGN PATENT DOCUMENTS 1,165,672   10/1958   France ..................... 126/271

Primary Examiner—Kenneth W. Sprague
Assistant Examiner—James C. Yeung
Attorney, Agent, or Firm—Alexis Barron

[57] ABSTRACT

For use in heating or cooling a building, there is provided a solar energy collecting system which includes a solar energy collecting device comprising a trough having internal surfaces for reflecting the rays of the sun onto solar energy collecting plates positioned in the trough, the internal reflecting walls of the trough and the positioning of the plates therein being such that the concentration of the sun's rays on the collecting plates varies depending on the angle of the sun with respect to the solar collecting device which itself is stationary. Each of the collecting plates is associated with a pipe which carries fluid which is heated by the sun's rays. The system includes thermostatically controlled valves associated with each of the collecting plates for selectively transferring to storage only that fluid which has been heated to a predetermined and sufficiently high temperature.

20 Claims, 7 Drawing Figures

SONIA SYSTEM

FIELD OF THE INVENTION

This invention relates to a solar energy collecting system which can be used, for example, in heating or cooling a house or other building.

At present, there are many types of solar energy heating and air conditioning systems which utilize energy from fluid heated by the sun's rays to a relatively low temperature, for example, 180° F. Such systems generally require the use of a relatively large storage capacity for the hot fluid so that the system can operate reliably on days when cloudy conditions exist. This increases the cost of the system and tends to limit the use to regions with a climate in which the sun shines regularly during the day.

Some systems use flat plate collectors without a means to concentrate the sun's rays. Such systems function at a relatively low temperature, for example, a maximum of about 200° F.

Collectors which follow the sun generally provide higher temperatures, but involve sun tracking equipment and mechanical gear and therefore are relatively expensive systems.

It is an object of the present invention to provide an improved solar energy collecting system which can be operated efficiently and which is relatively inexpensive to construct.

SUMMARY OF THE INVENTION

In accordance with the present invention, there is provided an improved solar energy collecting device characterized in that the device includes a plurality of means for receiving solar energy in a manner such that at different times during the day, solar rays are concentrated on different of the collecting means. The invention also encompasses selectively transferring energy from the collecting means receiving the greatest amount of energy. More specifically, there is provided a solar energy collecting device comprising: a trough having internal surfaces for reflecting sun rays and including two parallel concavely shaped floors, each having a bottom-most portion, an outer side portion and an inner side portion; solar energy collecting means extending vertically from each of said bottom-most portions and of predetermined height; said trough having exterior side walls extending from each of said outer side portions of said floors and having an intermediate portion and an upper portion, said intermediate portion being outwardly curved and said upper portion being inwardly curved, said upper portion and at least a segment of said intermediate portion extending beyond the height of said collecting means; and said trough having an internal wall positioned between said collecting means and terminating below the height of said collecting means.

In accordance with the invention, there is also provided a solar energy collecting system comprising a concave reflecting surface, a plurality of solar energy collecting means positioned within said concave reflecting surface for receiving solar energy, the amount of solar energy received by at least one of said collecting means being substantially different, at least some of the time during operation, than the amount received by other of said collecting means, and means for selectively transferring energy received by said collecting means away from collecting means receiving a predetermined amount of solar energy.

The present invention has a number of advantageous characteristics.

A system including various of the developments of the present invention can be operated without tracking of the sun. It can operate to generate temperatures as high as 400°–480° F. Systems including the present invention can be built with smaller storage capacities than needed for various types of known systems.

DETAILED DESCRIPTION OF INVENTION

Figure 1:
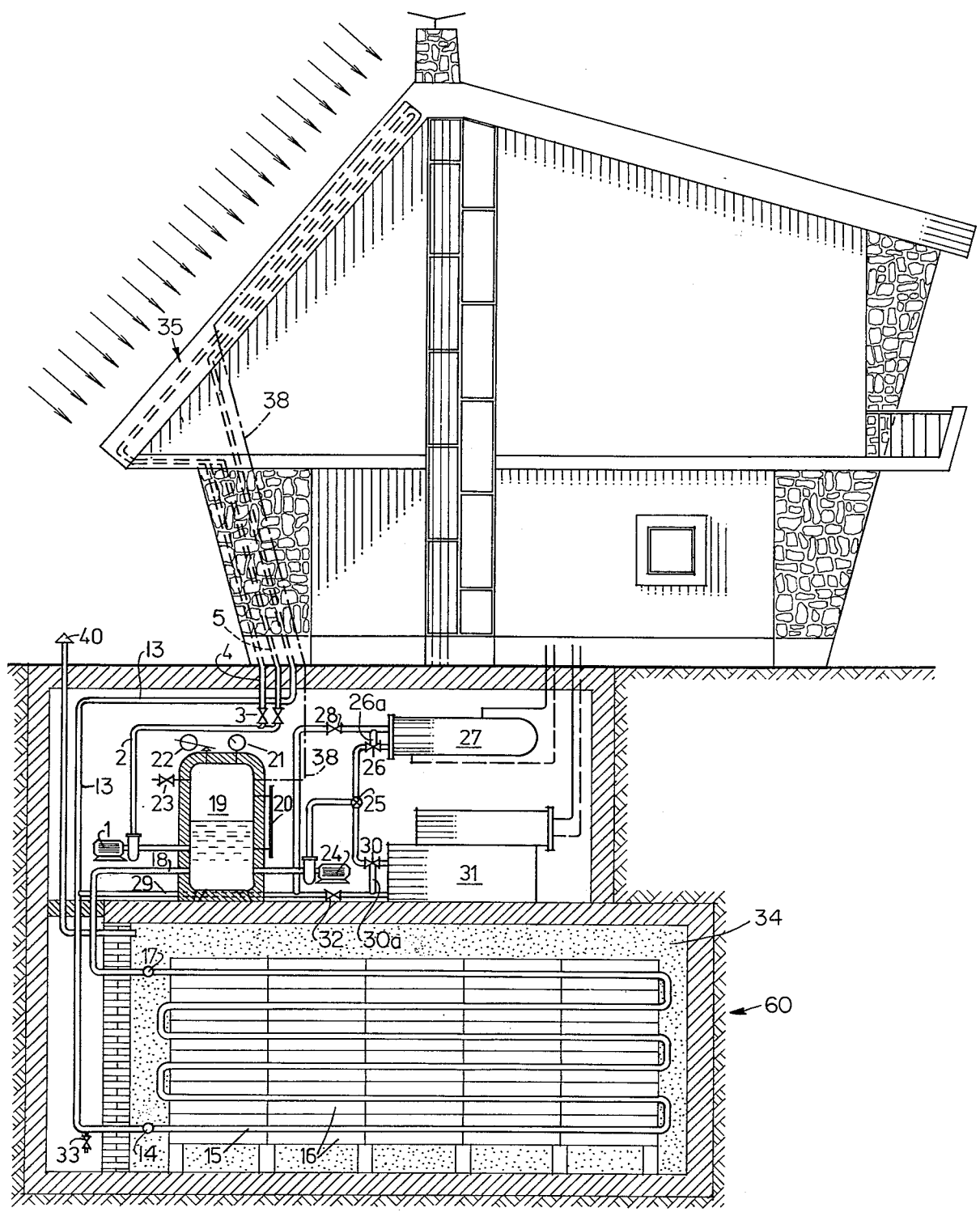
FIG. 1 shows a house equipped with a solar energy collecting system of the present invention.
Figure 2:
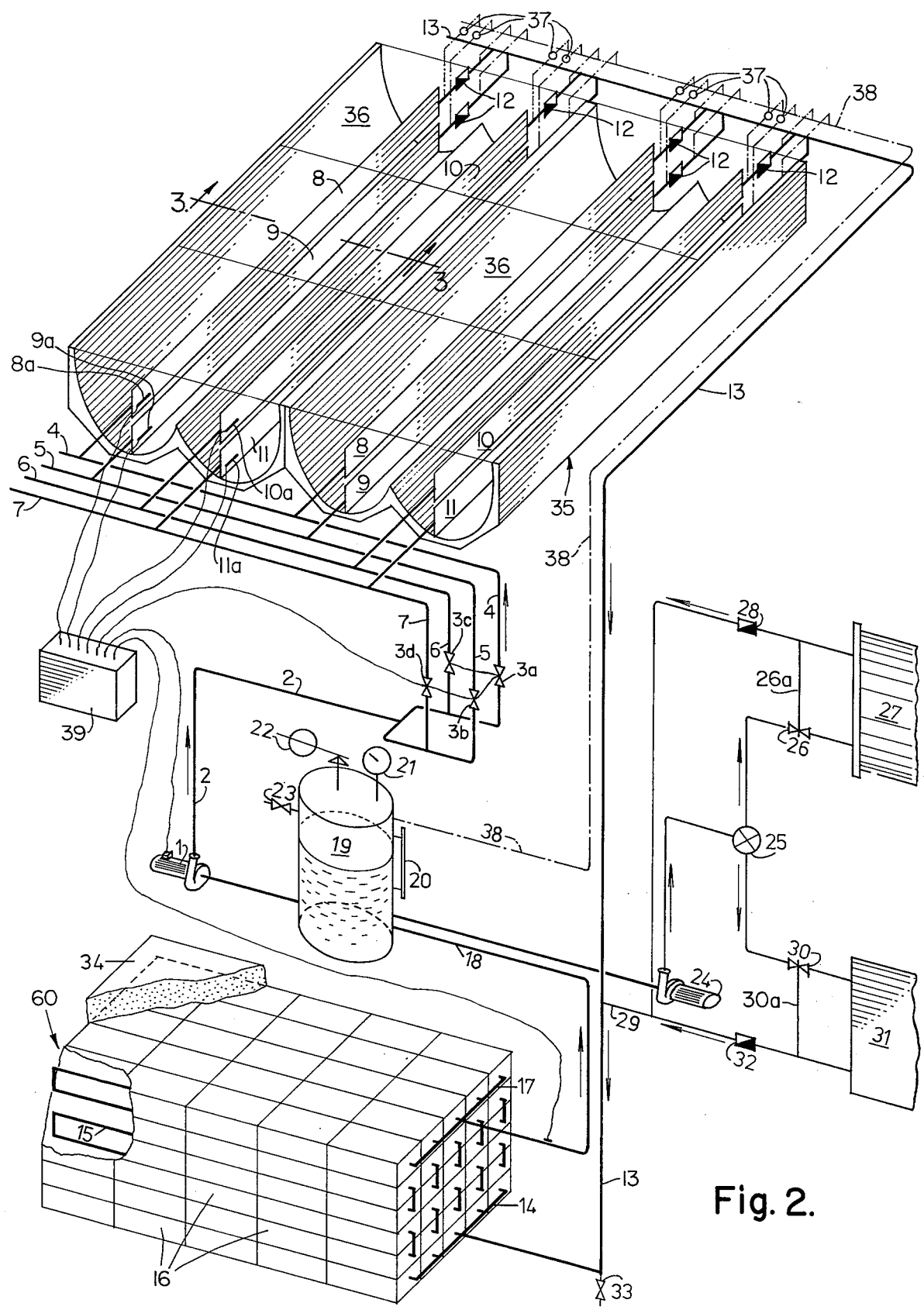
FIG. 2 shows a diagrammatic view of the solar energy collecting system of the present invention.

Referring to FIG. 1, multispeed circulating pump 1 pumps fluid from balancing tank 19 through pipe 2 and solenoid valves 3 and distributes the fluid to pipes 4, 5, 6 and 7, the latter two being shown in FIG. 2, and then to solar collector 35 on the roof of the house. (Heating of the fluid by the solar collector 35 is described in detail below.) Hot fluid, heated by the solar collector 35, flows through return pipe 13, provided with a drainage valve 33, to the lower header 14 and through circulating pipes 15 surrounded by brick blocks 16, of storage facility 60. The fluid flows from upper header 17 through pipe 18 to balancing tank 19.

Balancing tank 19 is equipped with level gauge 20, manometer 21, safety valve 22 and charging valve 23. Air ventilation pipe 38 connects the upper part of solar collector 35 and balancing tank 19. Brick blocks 16 are surrounded with insulation 34. Ventilation pipe 40 connects the storage facility 60 to the outside to allow free evaporation of any remaining water in the storage facility. The lower part of storage piping is provided with a drainage valve 33.

Second circulation pump 24 pumps hot fluid from balancing tank 19 to change-over valve 25 through which fluid is circulated to three-way modulating valve 26 which allows hot fluid to be circulated either to the heat exchanger 27 for the heating system or to the heat exchanger by-pass pipe 26a, and then through one-way valve 28 and return pipe 29 to the main return pipe 13 which delivers the fluid through storage facility 60 to the balancing tank 19. Change-over valve 25 may also direct hot fluid to three-way modulating valve 30 which allows fluid to be circulated either to the absorption chiller 31 for the air conditioning system or to the absorption chiller by-pass pipe 30a and then through one-way valve 32 and pipe 29 to main return pipe 13 which delivers fluid through storage facility 60 to balancing tank 19.

Pumps 1 and 24, balancing tank 19, heat exchanger 27 and absorption chiller 31, with attached pipes and valves, may be located in equipment room near the garage or in the basement of the house, as shown. Storage may also be located underground in the garden and not necessarily under the equipment room as shown in FIG. 1.

Referring to FIG. 2, pump 1 pumps fluid from balancing tank 19 through pipe 2 to four solenoid valves 3a, 3b, 3c and 3d. Solenoid valve 3a opens and pump 1 starts when thermostat 8a signals that high temperature has been reached on one of collecting plates 8, and fluid is circulated through pipe 4 to the collecting plates 8 and through the one-way valves 12 to main return pipe 13, lower header 14, circulating pipes 15, upper header 17 and through pipe 18 to balancing tank 19. When thermostat 9a signals that collecting plates 9 have reached high temperaure, solenoid valve 3b opens and the output of multispeed pump 1 is increased and fluid flows through pipes 4 and 5 to respective collecting plates 8 and 9, through the one-way valves 12 to main return pipe 13 and through storage to balancing tank 19. Fluid is circulated to collecting plates 10 and 11 having thermostats 10a and 11a in the same manner. When any thermostat 8a, 9a, 10a and 11a signals that the associated collecting plates are no longer at a high temperature, the respective solenoid valve closes and the output of the multispeed pump 1 is decreased. In the midday, collecting plates 10 and 11 are under concentration of the sun rays and fluid is direced to these plates through pipes 7 and 6. During late afternoon only plate 10 will be under the concentration of sun rays and fluid is circulated through pipe 6 to plate 10. When the temperature on all collecting plates falls below a predetermined level of economical collection, pump 1 stops and all solenoid valves 3a, 3b, 3c and 3d close. After a period of time, a time switch actuates the opening of all four solenoid valves to enable drainage of all fluid from the collectors to prevent heat loss nd freezing of the fluid during cold weather. Vacuum valves 37 provide free connection of upper part of the collectors with the upper part of balancing tank 19 through air ventilation pipe 38. Storage pipes 15 are surrounded by brick blocks 16 and insulated with insulation 34. Control box 39 receives the temperature of the collecting plates and of the fluid in the storage facility 60 and activates the solenoid valves 3a, 3b, 3c and 3d and circulation pump 1.

Figure 3:
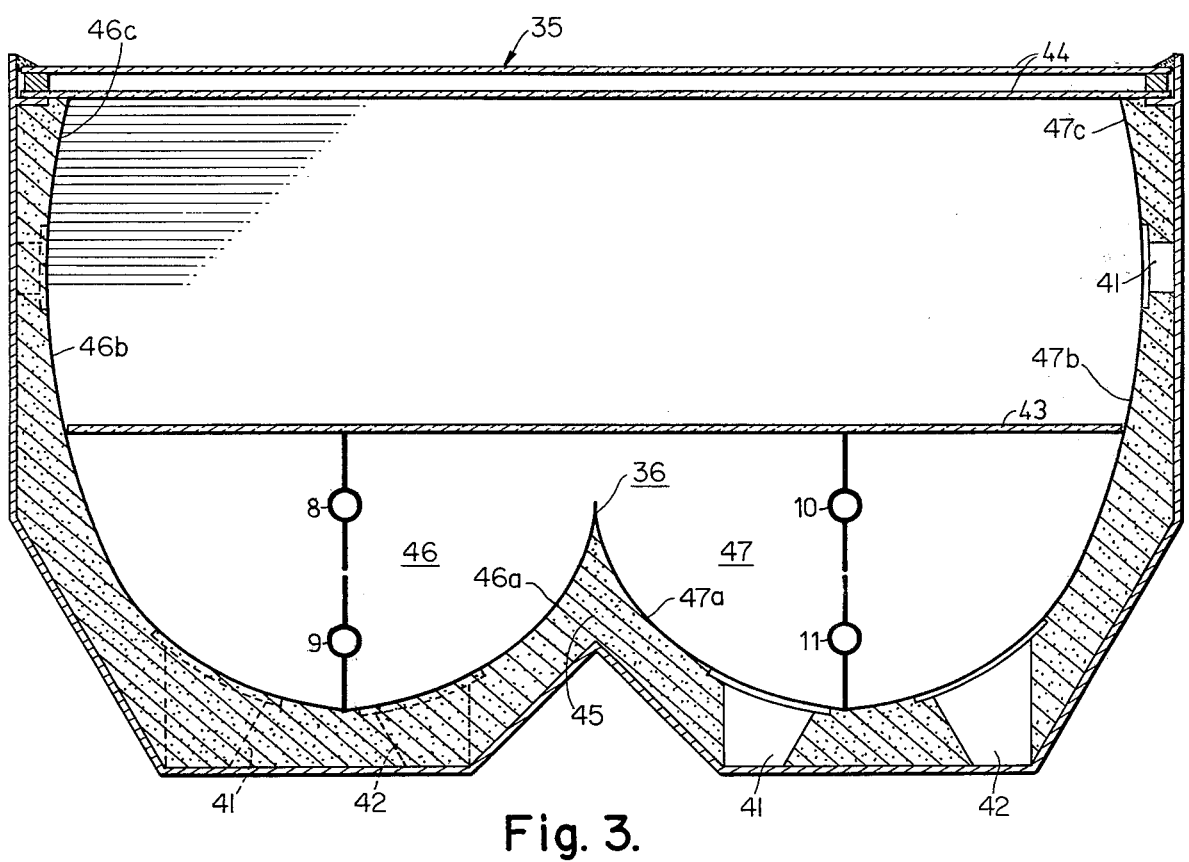
FIG. 3 shows a section of the solar collector taken along lines 3—3 of FIG. 2.

As shown in FIG. 3, the solar energy collecting device 35 comprises a trough 36 having two parallel concavely shaped reflecting surfaces 46 and 47 including inner reflecting surfaces 46a and 47a and outer reflecting surfaces 46b and 47b terminating in an inwardly projecting surface 46c and 47c. The solar energy collecting plates 8, 9, 10 and 11 extend vertically from the bottoms of the concavely shaped reflecting surfaces 46 and 47. The trough 36 is surrounded with insulation 45 and supported with supports 41 and 42. The collecting plates 8, 9, 10 and 11 are insulated with a glass plate 43 and double glass plate 44 at the top of the trough.

Figure 4:
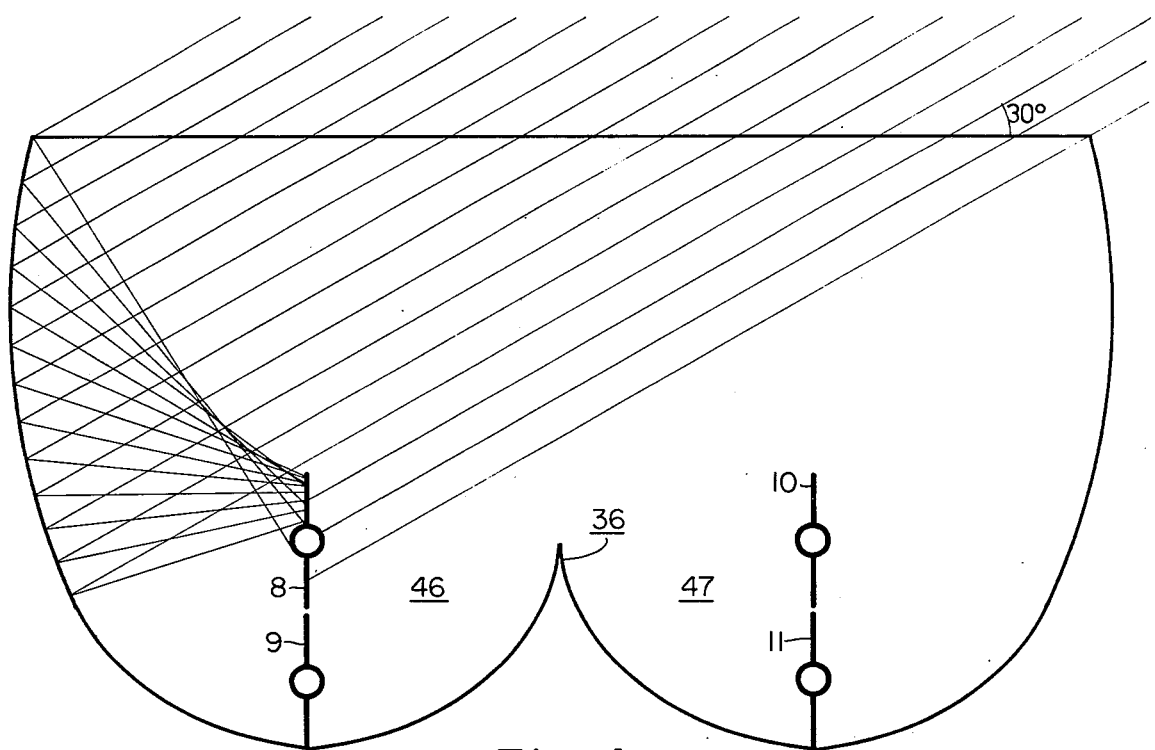
FIG. 4 shows the sun rays incident at an angle of 30° with the section of FIG. 3 shown diagrammatically.
Figure 5:
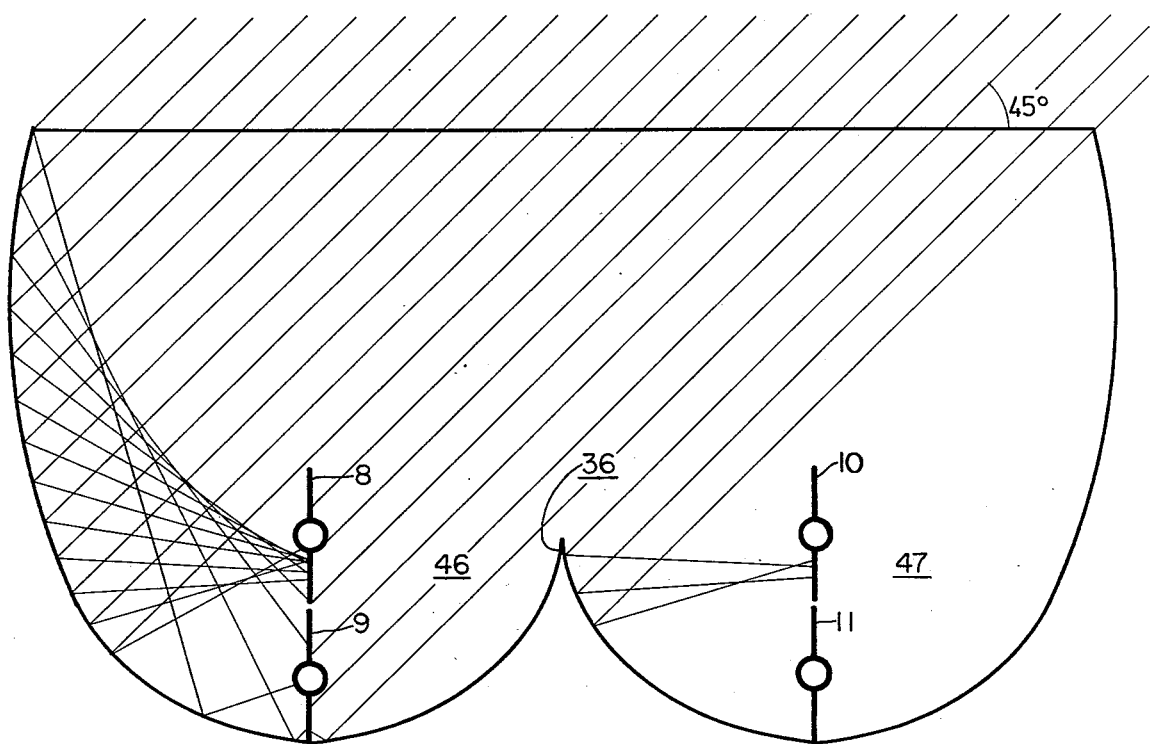
FIG. 5 shows sun rays incident at an angle of 45° with the section of FIG. 3 shown diagrammatically.

FIG. 4 shows the incidence of sun rays during the morning. Sun rays incident at a 30° angle with the trough are concentrated on collecting plate 8. As shown in FIG. 5, sun rays incident at a 45° angle with the trough are concentrated principally on collecting plates 8 and 9 and some of the rays begin to heat plate 10.

Figure 6:
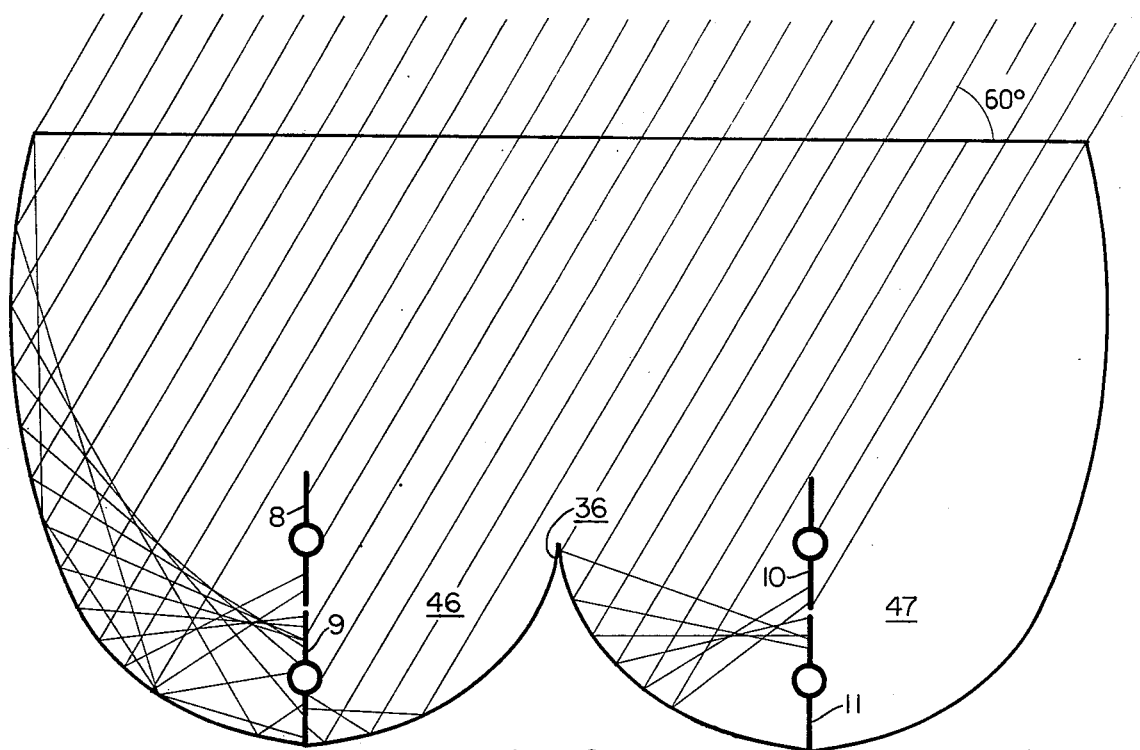
FIG. 6 shows sun rays incident at an angle of 60° with the section of FIG. 3 shown diagrammatically.
Figure 7:
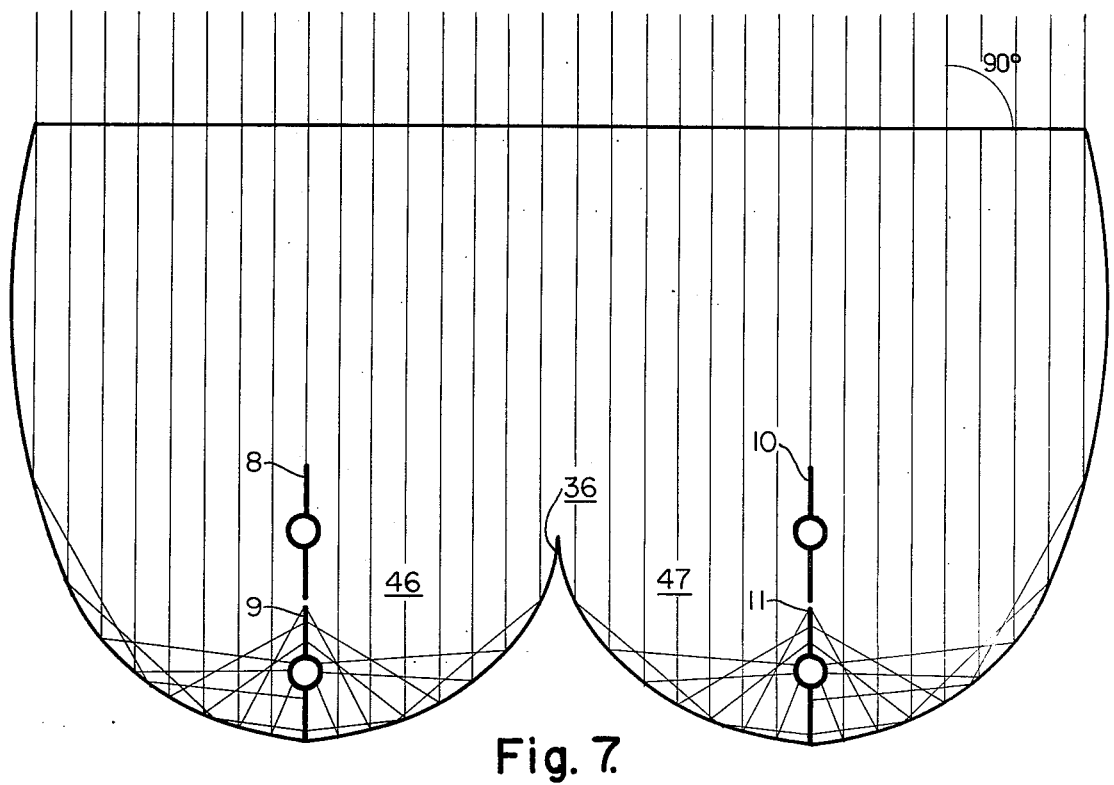
FIG. 7 shows sun rays incident at an angle of 90° with the section of FIG. 3 shown diagrammatically.

As shown in FIG. 6, sun rays incident at a 60° angle to the trough are concentrated mainly on collecting plates 9 and 11 and collecting plates 8 and 10 are exposed to very small concentration. As shown in FIG. 7, sun rays incident at a 90° angle with the trough are concentrated on collecting plates 9 and 11. During the afternoon, the sun rays are similarly concentrated on different plates.

In connection with the system described above, it is recommended that there be used a fluid having a low vapor pressure at the operating temperatures of the system and good heat transfer properties. Examples of such fluids are liquids sold under the trademarks DOWTHERM-A (boiling point of about 496° F. and melting point of about 53° F.) and DOWTHERM-E (boiling point of about 350° F. and a melting poit of about 0.° F.).

The system can be operated under slight pressure by including in the balancing tank 19 a pressurized neutral gas to thereby deter or prevent the evaporation of the fluid.

A central control box, which can be conveniently located in the house, can, in addition to performing the functions of control box 39, also control the heating and air conditioning systems for regulating the temperature of the house.

The collecting plates 8, 9, 10 and 11 can be coated with a material that has high short-wave absorptance and low long-wave emittance. The reflecting surfaces of the trough can be manufactured from metal sheets coated with a reflecting material which is mirror polished.

The solar collectors of the present invention may be inclined and facing south at an angle corresponding to the latitude in the northern hemisphere and inclined and facing north at an angle corresponding to the latitude in the southern hemisphere.

In summary, it can be seen that the system described above is such that a heat transfer fluid can be heated to a relatively high temperature and, if desired, used exclusively to provide energy for operating the heating or air conditioning units of a building. This provides for very efficient operation. Additionally, the energy from the hot fluid can be stored for future use. It should be appreciated also that the system is capable of operating in a manner such that throughout any given day, relatively high amounts of energy can be collected from the sun inasmuch asthe sun's rays are concentrated on various collectors, depending on the position of the sun. This generates high fluid temperatures. It should also be appreciated that the system can be operated in a manner such that when the temperature of the energy storage facility is higher than the temperature of the fluid in contact with the collector plates, fluid transfer of the collecting plates can be terminated.

I claim:

1. A solar energy collecting device comprising a trough having internal reflective surfaces for reflecting sun rays and including:
(A) two parallel concavely shaped floors, each having a bottom-most portion, an outer side portion and an inner side portion;
(B) solar energy collecting means extending vertically from each of said bottom-most portions and of predetermined height;
(C) said trough having exterior side walls extending from each of said outer side portions of said floors and having an intermediate portion and an upper portion, said intermediate portion being outwardly curved and said upper portion being inwardly curved, said upper portion and at least a segment of said intermediate portion extending beyond the height of said collecting means; and (D) said trough having an internal wall positioned between said collecting means and terminating below the height of said collection means.

2. A solar energy collecting device according to claim 1 wherein said internal wall comprises the joinder of each of said inner side portions of said concavely shaped floors.

3. A solar energy collecting device according to claim 2, wherein said collecting means includes means for transferring energy away from said collecting means.

4. A solar energy collection device according to claim 1 wherein said collection means includes means for transferring energy away from said collecting means.

5. A solar energy collecting device according to claim 1 including a plurality of said troughs.

6. A system according to claim 6 including insulating means covering the top of said trough and which permit the passage of sun rays therethrough.

7. A solar energy collecting system comprising:
(A) a solar energy collecting device comprising a trough having internal reflective surfaces for reflecting sun rays and including:
  (i) two parallel concavely shaped floors, each having a bottom-most portion, an outer side portion and an inner side portion;
  (ii) solar energy collecting means extending vertically from each of said bottom-most portions and of predetermined height;
  (iii) said trough having exterior side walls extending from each of said outer side portions of said floors and having an intermediate portion and an upper portion, said intermediate portion being outwardly curved and said upper portion being inwardly curved, said upper portion and at least a segment of said intermediate portion extending beyond the height of said collecting means; and
  (IV) said trough having an internal wall positioned between said collecting means and terminating below the height of said collecting means; and
(B) means for selectively transferring energy collected by said collecting means away from said collecting means.

8. A solar energy system according to claim 7 wherein said solar energy collecting device includes insulating means covering the top of said trough and which permit the passage of sun rays therethrough.

9. A solar energy collecting system according to claim 7 wherein said internal wall comprises the joinder of each of said inner side portions of said concavely shaped floors.

10. A system according to claim 7 wherein said (B) means includes temperature responsive means for activating the selective transfer of said energy collected by said collecting means.

11. A system according to claim 7, wherein said plurality of collecting means are positioned with respect to the sun in a manner such that, at least some time during the day, one or more, but not all, of said collecting means collect a greater amount of solar energy than the other of said collecting means, and wherein said (B) means includes activating means for transferring energy away from said collecting means which is collecting the greatest amount of solar energy.

12. A system according to claim 11 wherein said (B) means include:

(A) fluid for transferring said energy from said collecting means;
(B) means for circulating said fluid;
(C) means for sensing the temperature of said collecting means;
(D) valve means for controlling the flow of said fluid and responsive to said (C) means.

13. A system according to claim 7 including:
(A) storage means for storing energy transferred away from said collecting means; and
(B) means responsive to the temperature of said storage means for transferring energy collected by said collecting means away from said collecting means only when the temperature thereof is greater than the temperature of said storage means and to increase the energy of said storage means.

14. A system according to claim 7 wherein the collecting means which extends from each of said bottom-most portions comprises a plurality of collecting means.

15. A solar energy collecting system comprising: a concave reflecting surface, a plurality of solar energy collecting means positioned longitudinally and in spaced relationship within said concave reflecting surface for receiving solar energy and in a manner such that the amount of solar energy received by at least one of said collecting means is substantially different at least some of the time during daily operation, than the amount received by other of said collecting means, and means for transferring energy selectively, depending on the amount of solar energy received, away from said one or said other or both of said one and said other collecting means.

16. A system according to claim 15 wherein said means for selectively transferring energy away from said collecting means includes temperature responsive means for activating the selective transfer of said energy collected by said energy collecting means.

17. A system according to claim 15 including: (a) fluid for transferring energy away from said collecting means; (b) means for circulating said fluid; and (c) thermostatically controlled valve means responsive to the temperature of said collecting means for selectively circulating said fluid.

18. A system according to claim 15 wherein said concave reflecting surface comprises a trough having two parallel concavely shaped floors.

19. A solar energy collecting system comprising:
(a) A concave reflecting surface;
(b) First and second solar energy collecting means positioned longitudinally and in spaced relationship within said concave reflecting surface for receiving solar energy and in a manner such that the aount of solar energy received by said first collecting means is substantially greater than the amount of solar energy received by said second collecting means at least some of the time during daily operation;
(c) Transfer means associated with each of said first and second collecting means for transferring energy away from each of said first and second collecting means; and
(d) means for selectively effecting the transfer of energy away from said first collecting means, but not said second collecting means, when the amount of solar energy received by said first collecting means is substantially greater than the amount of solar energy received by said second collecting means and when said first collecting means receives a predetermined amount of solar energy.

20. A system according to claim 19 wherein the amount of solar energy received by said first and second collecting means is substantially the same at least some of the time during operation and including means for selectively effecting the transfer of energy away from both of said first and second collecting means when the amount of solar energy received by said first and second collecting means is substantially the same and when they receive a predetermined amount of solar energy.

* * * * *

UNITED STATES PATENT AND TRADEMARK OFFICE
CERTIFICATE OF CORRECTION

PATENT NO. : 4,121,566
DATED : October 24, 1978
INVENTOR(S) : Ljubomir Radenkovic It is certified that error appears in the above-identified patent and that said Letters Patent are hereby corrected as shown below:

Cover page of patent, in line [54], "SONIA SYSTEM" should read --SOLAR ENERGY COLLECTING SYSTEM--.

Column 1, the title "SONIA SYSTEM" should read --SOLAR ENERGY COLLECTING SYSTEM--.

Column 3, line 36, "nd" should read --and--.

Column 4, line 11, "poit" should read --point--.

Column 4, line 42, "asthe" should read --as the--.

Column 5, line 18, "6" second occurrence should read --1--.

Column 5, line 39, "IV" should read --(iv)--.

Column 6, line 54, "aount" should read --amount--.

Signed and Sealed this

Twenty-ninth Day of May 1979

[SEAL]

Attest:

RUTH C. MASON
Attesting Officer

DONALD W. BANNER
Commissioner of Patents and Trademarks